Dec. 21, 1965   A. P. TAYLOR   3,224,176
POWER OPERATED GANG MOWER
Filed June 18, 1964   3 Sheets-Sheet 1

INVENTOR
ALEXANDER P. TAYLOR
BY Felix A. Russell
ATTORNEY

Dec. 21, 1965    A. P. TAYLOR    3,224,176
POWER OPERATED GANG MOWER
Filed June 18, 1964                    3 Sheets-Sheet 2

INVENTOR
ALEXANDER P. TAYLOR

BY *Felix A. Russell*

ATTORNEY

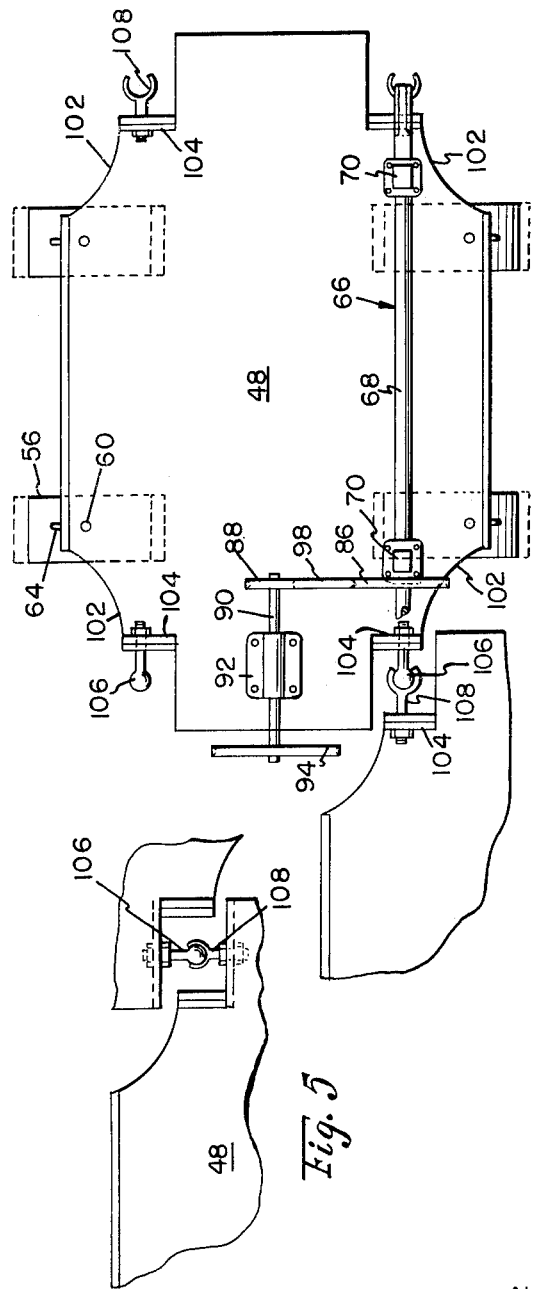

United States Patent Office 3,224,176
Patented Dec. 21, 1965

3,224,176
POWER OPERATED GANG MOWER
Alexander P. Taylor, 3108 Fairview Ave.,
Parkersburg, W. Va.
Filed June 18, 1964, Ser. No. 376,063
12 Claims. (Cl. 56—7)

This invention relates to grass mowers and more particularly it relates to a gang type mower wherein a plurality of individual mowing units are juxtaposed and interconnected in such a manner that they can cut a wide path or swath through the grass.

Gang type mowers have found particularly utility in the past in grass cutting operations on golf courses, parks, cemeteries and other locations where a wide expanse of grassy terrain needs to be periodically cut. In general, such gang mowers have been formed by arranging several reel type mower units in a side by side aligned relationship, as by mounting them all within a common enlarged frame, and thereafter towing all of the aligned units by attaching the frame to an operating vehicle such as a tractor. As the tractor was operated or driven, the wheels mounting the reels were driven in a ground engaging manner, thus causing the reels to rotate and to cut a path through the grass. The width of the cut path corresponded to the width of the arrangement of aligned mower units.

It has been found, however, that in actual practice, such prior art gang mowers have not proved to be altogether satisfactory. One important drawback with such prior art devices was the fact that often a small space would exist between adjacent mower units in a line and by virtue of that small space, a narrow streak or strip of uncut grass would be left after a cutting operation and thus a recutting operation was required to eliminate the strip. Moreover, even if attempts were made to eliminate the formation of such streaks, as by mounting separate mowers behind each spaced pair of mower units, such attempts were still unsuccessful in rough and uneven terrain. The inability of such prior art gang mowers to track evenly or follow contiguously to the contour of uneven terrain represented another serious drawback which made their use unsatisfactory. When attempts were made to use such gang mowers on rough or hilly terrain, one mower unit would be raised by a hill while another mower unit would be lowered by a gully and all the units between the raised and lowered ones would be suspended linearly between them. If the ground beneath such suspended units dipped away from the units in any appreciable manner, the grass thereon would remain uncut, or if it were cut at all, such cutting would not be to the proper length.

There were, of course, numerous other shortcomings and deficiencies which beset prior art gang mowers. Since the mowing units only operated when the operating vehicle was in motion, it was difficult to start out cutting high grass since the inertia of the units could not be easily overcome in such grass. Moreover, the frames which interconnected or assembled the various individual mowing units were somewhat unwieldy, thus making pattern control difficult and presenting the possibility of jackknifing when the operating vehicle moved in reverse. Still further, such prior art gang mowers were heavy and bulky and thus had the tendency to sink into soft or muddy ground. When such sinking occurred, the reels usually become clogged with mud and stalled.

With the foregoing in mind, it is, therefore, an object of the present invention to overcome the difficulties and deficiencies associated with the prior art and to provide in their stead, an improved gang mower wherein each of the mowing units is power operated.

Another object of the present invention is to provide a gang type grass mower which readily conforms to the contour of the terrain over which it passes during a cutting operation.

Further objects of the present invention include the provision of a power operated gang mower which: (a) has a common driving arrangement for all of the mowing units therein; (b) has the individual mowing units therein properly arranged and overlapped so that no uncut streaks or strips of grass will be left after a cutting operation is completed; (c) is adjustable in height so that the amount of height of grass to be left after a cutting operation can be selectively varied; (d) will operate continuously, even while the operating vehicle is stationary; (e) provides for easier cutting pattern control; and (f) is lightweight and hence is not readily susceptible to clogging due to becoming mired down in soft or muddy ground.

Still further, and somewhat more specific, objects of the present invention include the provision of a power operated gang mower which (1) has the individual mowing units interconnected in such a manner as to allow them to move vertically to the ground and, in a limited sense, laterally along the ground to thereby enable the mower to follow the variable contour of the ground; (2) has the individual mowing units therein interconnected to one another in a novel and non-obvious manner; (3) is provided with a pulling frame which can be attached to an operating vehicle and which mounts the mowing units in their proper positions and permits them to move through their proper movements; (4) has a frame system which will not jackknife when the vehicle to which the frame is attached is operated in reverse; and (5) permits the operator to closely control the cutting pattern and to move into and mow small and difficult to reach sections, since the unit can follow the same pattern at all times by virtue of the fact that the individual mowing units are restrained from any wide latitude of lateral movement during operation.

Other objects, advantages and salient features of the present invention will become apparent from the following detailed description, which, taken in connection with the annexed drawings, discloses a preferred embodiment thereof.

Referring to the drawings:

FIGURE 4 is a top plan view of an individual mowing unit showing its manner of coupling to the next adjacent unit; and FIGURE 5 is a fragmentary top plan view of an alternate means for coupling adjacent units.

Figure 1:
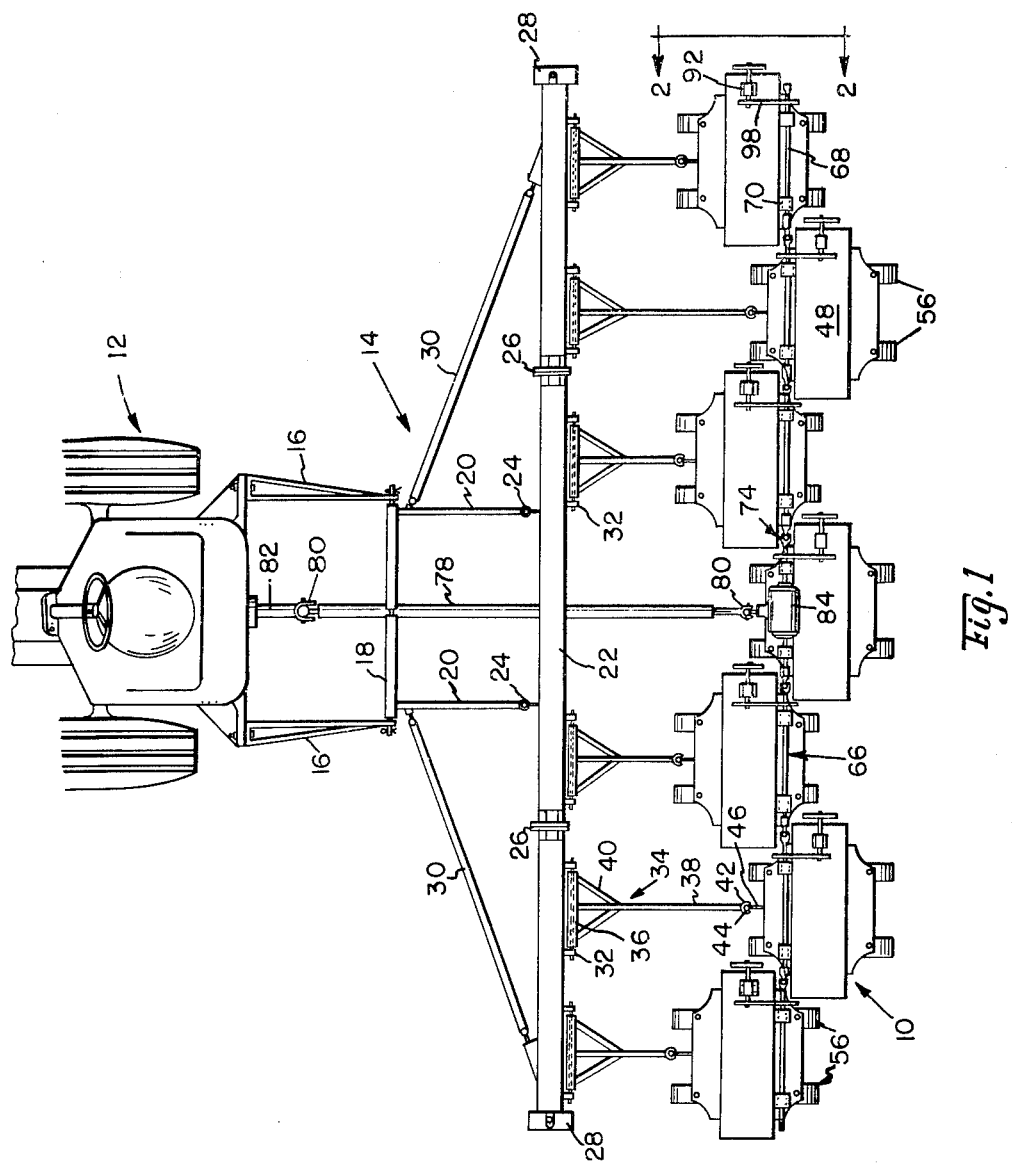
FIGURE 1 is a top plan view of a gang mower in accordance with the principles of the present invention.

In general, and as can best be seen from FIGURE 1, the present invention includes a plurality of interconnected individual mowing units generally designated 10, an operating vehicle generally designated 12, and a frame means 14 attaching the mowing units 10 to the operating vehicle. The operating vehicle 12 can be a tractor, a truck, a jeep or any other suitable vehicle capable of operation over rough and uneven terrain.

The pull frame means 14 is attached to a pair of spaced rigid arms 16 which extend rearwardly from opposite sides of the vehicle 12. A crossbar 18 at the forward end of the frame 14 extends between and is rotatably mounted within the spaced arms 16 and is retained therein by suitable fastening devices such as cotter pins applied at its opposite ends. A pair of spaced tie rods 20 extend rearwardly from the cross bar 18 to be pivotally connected to a main draw or pull bar 22 by means of ball and socket connections 24. The pull bar 22 is formed as a foldable or sectional member having hinges 26 spaced at intervals along its length to thus allow one section to pivot angularly upwardly or downwardly with respect to its adjacent sections. Swivelable caster wheels 28 are mounted at opposite ends of the bar 22 to support the bar while it is being moved across the ground. Angularly extending links 30 extend between the outer end portions of the bar 22 and the tie rods 20 and these links are also pivotally attached at their ends to form the forward end of the frame 14 into an efficient and yet yieldable truss unit.

A plurality of spaced sets of ears 32 with aligned apertures therein extend rearwardly from the pull bar 22, and within each of these sets of ears, a tow rod assembly generally designated 34 is pivotally mounted. The tow rod assembly includes a transverse shaft 36 extending between the ears 32 of a set and being pivotally mounted in the aligned apertures therein, a rearwardly extending rod 38 affixed to and projecting prependicularly rearwardly from the rod 36, and a pair of bracing rods or members 40 firmly securing the rods 36 and 38 together. The outboard or rearward end of the rod 38 is formed as a socket 42 which can receive and accommodate a ball member 44 affixed to the forward end of a rod 46 which projects from each of the individual mowing units 10.

Figure 2:
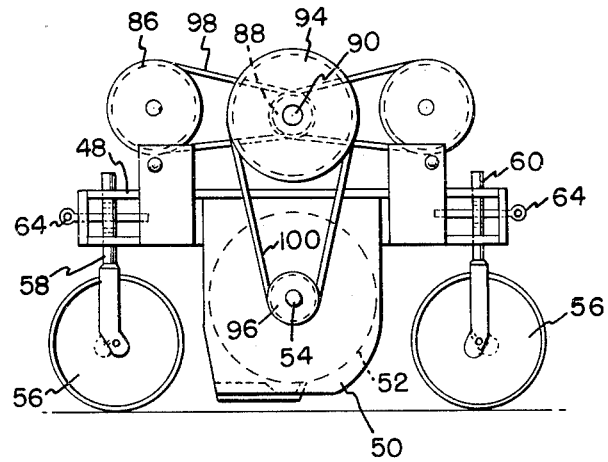
FIGURE 2 is an end view of one of the mowing units within the gang mower, as seen along line 2—2 of FIGURE 1.
Figure 3:
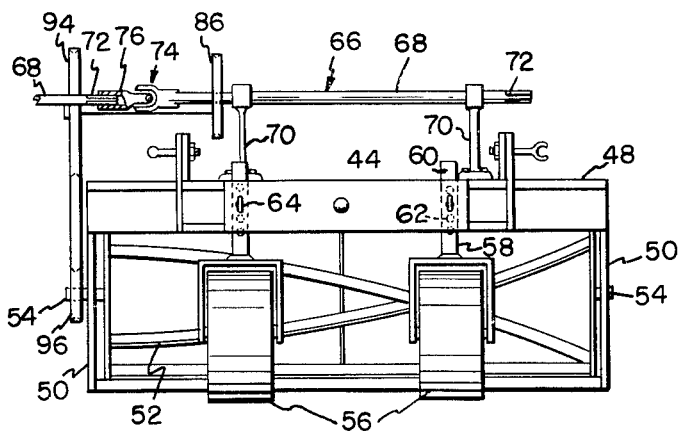
FIGURE 3 is a rear side elevational view of the mowing unit of FIGURE 2.

Each of the individual mowing units 10 has an upper frame 48 with depending portions 50 extending integrally from the periphery thereof at its opposed ends. Journalled between these depending portions 50 is a cutter reel 52 which extends in a generally parallel manner beneath the frame 48 and which is rotatably mounted in place by stub shafts 54 extending from opposite ends of the reel into and through aligned openings in the portions 50. Each unit 10 is supported by four spaced caster wheels 56 which are adjustably mounted within the frame 48 to permit the cutter reel 52 to be moved relatively to the ground to thereby selectively vary the length of the grass which remains after a cutting operation is completed. While this adjustable mounting means can take any suitable form, an exemplary one which is illustrated in FIGURES 2 and 3 has the wheels 56 attached by swivel connections 58 to upstanding posts 60 having a plurality of spaced transverse holes 62 extending therethrough. Pins 64 can be digitally introduced through aligned holes in the frame 48 and through holes 62 in the wheel posts 60. By pushing the pins 64 through different holes 62, the height of the mower unit 10 can be selectively raised or lowered.

As can best be seen from FIGURE 1, the individual mowing units 10 are arranged or aligned in a stepped or alternately disposed relationship which allows a common linear power shaft to extend across all of the units. The power shift is generally designated 66 and is formed in separate sections 68, one of which is supported in spaced relation above each unit frame 48, as shown in FIGURE 3. Each of the sections 68 is journalled in a pair of spaced upstanding braces 70 affixed to and projecting above the frame 48. One end of the section or rod 68 is formed as a spline 72 and the other end thereof is formed as a universal joint 74 of conventional configuration and having a short sleeve 76 forming the terminal portion thereof. Each sleeve 76 is shaped to receive and accommodate the splined portion 72 from the power shaft section of the next adjacent mower unit 10, and thus the spline can move or slide through a limited lateral movement while remaining housed within the sleeve. When all of the power shaft sections 68 are interconnected to one another to form the continuous power shaft 66 having a linear axis, the separate mowing units 10 are alternately disposed forwardly and rearwardly of the axis in the manner shown in FIGURE 1 so that the end portions of each unit 10 overlap those of the next adjacent units to assure that no streaks or uncut spaces occur between adjacent mowing units. The only requirement for producing such a stepped arrangement of mower units is that the pull rods 38 be foreshortened for those units forward of the power shaft axis and elongated for those units rearward thereof.

In order to deliver power to the power shaft 66 for driving the same, a propellor shaft or drive shaft 78 is provided at its opposite ends with universal joint couplings 80, one of which connects to a power take off shaft 82 projecting from the operating vehicle 12 and the other of which connects to a gear drive 84 on the central mowing unit 10. The gear drive 84 may take any suitable form, such as a conventional ring gear and pinion, which, in operation, converts the rotary motion of the propellor shaft 78 into rotary motion of the power shaft 66.

Since the reel 52 of each mowing unit 10 is to be positively driven by the power shaft 66, suitable means must be provided for delivering the rotary motion of the shaft 66 to the individual reels 52. This means can be of any suitable form, such as a belt and pulley system, a chain and sprocket system, or a gear train system, but for purposes of illustration, a belt and pulley system has been shown in FIGURES 2–4, and the operation of this system will now be described.

One pulley 86 is affixed to each power shaft section 68 adjacent its universal joint 74. Aligned with this pulley 86 and disposed medially of the unit 10 is a second pulley 88 attached to the inboard end of a shaft 90 which is rotatably retained on the frame 48 by a bearing bracket 92. On the outboard end of the shaft 90, another pulley 94 is affixed, and this pulley 94 is aligned in a coplanar relationship over still another pulley 96 mounted upon the reel stub shaft 54. A first driving belt 98 is trained between the pulleys 86 and 88 and a second driving belt 100 is trained between the pulleys 94 and 96 whereby, as the power shaft 68 rotates, the belt 98 is driven to rotate the shaft 90 and drive the belt 100 which causes corresponding rotation of the pulley 96. Since the pulley 96 is affixed to the cutter reel 52, rotation of the pulley serves to drive the reel. A similar belt and pulley system, or other equivalent system, is utilized on each of the mowing units 10 and thus operation of the power shaft 66 causes a simultaneous rotation of all of the cutter reels 52. Since the reels are positively driven, they can be started in motion even while the vehicle 12 is stationary, and accordingly, no inertia needs to be overcome to commence a cutting operation and the mower can immediately start cutting, even in high grass.

Although each of the mowing units 10 is attached to a common pull bar 22 and is driven by a common power shaft 66, some means must still be provided for coupling each unit 10 to its next adjacent unit in such a manner that the two can move or swivel freely relative to one another in a vertical plane, thus allowing the units 10 to compensate for undulating or uneven terrain. It should first be noted the corners of the unit frames 48 are provided with arcuate notches 102 which permit the units to be closely spaced to one another in their stepped, overlapping arrangement. In fact, as can be noted from FIGURES 4 and 5, the terminal end of one unit 10 actually projects laterally into the space subtended by the arcuate notch 102 on the next adjacent unit. To now assemble the two units into coupled relationship, a ball and socket swivel arrangement is used. As shown in FIGURE 4, lateral upstanding flange sections 104 are provided adjacent all four corner notches 102 on each unit 10. At one side or end of a unit, two ball members 106 are mounted within these sections 104 and at the other or opposite end of the unit, two socket members 108 are similarly mounted. When two units 10 are brought into their proper overlapping relationship, a ball member 106 on one unit fits into a socket member 108 on the other unit and the two units are thereby swivelly connected. It will be noted from FIGURE 1 that when the rear ball on one unit fits into the forward socket on a second unit, the opposite end of that second unit will have its forward ball fitting into the rear socket of a third unit. In the preferred method of construction, the normal axis of a ball and socket swivel 106, 108 is generally parallel to the axis of the power shaft 66. However, as shown in FIGURE 5, a modified method of construction can be used wherein the ball and socket axis is generally perpendicular to that of the power shaft.

In use, mere starting of the driving motor of the vehicle 12 is sufficient to initiate rotation of the power shaft 66 and hence to cause a corresponding and simultaneous rotation of the cutting reels 52 on each of the mowing units 10. When the vehicle 12 is set into motion, the frame 14 tows the ganged mowing units across the terrain, with such units cutting a wide swath as they move. Each unit is free to pivot axially of the pull bar 22 to allow the mower to pass freely over broad ridges of terrain extending axially of the pull bar, and thus the mowing units can closely follow the terrain contour even if it is hilly. If the mower passes along a hill or undulation extending axially of the drive shaft 78 so that one or more of the units must move relatively to another unit, the ball and socket swivel connection 108, 106 permits such movement. During such movement, the power shaft 66 will be bent at its universal joints 74 and, in fact, the splined portion 72 may slide slightly further into or out of its nesting sleeve 76, but the shaft will nonetheless continue to operate to transmit power to the cutting reels on the mowing units. It will thus be appreciated that thus regardless of the contour of the terrain over which the mower is operated, the mowing units will follow contiguously to its shape and will thus mow the grass thereon to a smooth and even level.

It should be understood that the invention described herein is not to be limited by its conventional features, as for instance, the cutting blade means in the mowing units. Although the type of cutting blade means described herein is a reel cutter having a central shaft extending generally parallel to the axis of the power shaft 66, it should be recognized that the cutting blade can also be of the rotary type having a central shaft axis generally perpendicular to the axis of the power shaft 66. Moreover, although the drive shaft 78 has been described as being driven by the motor of the operating vehicle 12, any suitable driving motor is satisfactory and if, for instance, the operating vehicle 12 were a truck, a separate operating motor could be supplied on the bed thereof.

After reading the foregoing detailed description, it should be apparent that the objects set forth at the outset thereof have been successfully achieved by the invention as described therein and as defined in the appended claims.

What is claimed is:

1. A gang mower comprising, in combination:
   a plurality of individual mowing units having rotatable cutting blade means therein;
   a pull frame having said mowing units secured to a portion thereof and adapted to be attached to a vehicle for moving said mowing units across the terrain to be mowed;
   a common power shaft extending between each of said mowing units to operate the cutting blade means therein; and
   power supply means for operating said power shaft to thus cause said cutting blade means to sever the grass on the terrain beneath them;
   said mowing units being arranged in a juxtaposed relationship wherein the cutting blade in one unit overlaps the cutting blade in the next adjacent unit so that no uncut strips of grass are left remaining on said terrain after said mower has passed thereover;
   said mowing units being arranged in an alternate stepped arrangement on opposite sides of said power shaft whereby one mowing unit cutting blade means is disposed on one side of the axis of said power shaft and the next adjacent mowing unit cutting blade means is disposed on the opposite side of the axis of said shaft.

2. A gang mower comprising, in combination:
   a plurality of individual mowing units having rotatable cutting blade means therein;
   a pull frame having said mowing units secured to a portion thereof and adapted to be attached to a vehicle for moving said mowing units across the terrain to be mowed;
   said pull frame comprising,
   a relatively short cross bar which is adapted to be rotatably connected between a pair of spaced arms extending rearwardly from said vehicle, an elongated draw bar which is disposed rearwardly of said cross bar in spaced parallel relation thereto, said draw bar comprising a central section and a pair of end sections, each of which is hingedly connected at one end to said central section for vertical swinging movement with respect thereto, said central section being pivotally connected to the rear ends of a pair of spaced parallel tie rods which are rigidly secured to and extend rearwardly from said cross bar, a pair of angularly disposed links which are pivotally connected between the forward ends of said tie rods and the free ends of said end sections;
   individual means by which each of said mowing units is pivotally attached to said draw bar for swingable movement axially thereof, said mowing units being arranged in juxtaposed relationship wherein the cutting blade in one unit overlaps the cutting blade in the next adjacent unit so that no uncut strips of grass are left remaining on said terrain after said mower has passed thereover;
   a common power shaft extending between each of said mowing units;
   power input means connected to said power shaft through which a power supply source is adapted to be operatively connected to said power shaft for rotating said power shaft, and individual means carried by each of said mowing units by which the cutting blade thereof is connected to said power shaft for rotation thereby.

3. A gang mower as defined in claim 2 wherein said power shaft is formed of individual interconnectable sections, one carried on each of said mowing units.

4. A gang mower as defined in claim 3 wherein each of said interconnectable sections is provided at one end with a splined portion and at its opposite end with a universal joint carrying a sleeve thereon whereby the splined portion on one section can be slidably introduced into the sleeve on the next adjacent section to thus interconnect the power shaft sections to one another.

5. A gang mower as defined in claim 3 wherein said mowing units are arranged in an alternate stepped arrangement on opposite sides of said power shaft whereby one mowing unit cutting blade means is disposed on one side of the axis of said power shaft and the next adjacent mowing unit cutting blade means is disposed on the opposite side of the axis of said shaft.

6. A gang mower as defined in claim 2 but further characterized by a ball and socket swivel connection between each of said mowing units to allow one unit to be swivelled relatively to another while said mower passes over rough terrain.

7. A gang mower as defined in claim 2 wherein each of said mowing units is provided with spaced terrain engaging wheels and means for adjusting the height of said wheels to vary the position of said cutting blade means relative to said terrain.

8. A gang mower comprising, in combination:
   a plurality of mowing units having rotatable cutting blade means therein;
   each of said mowing units including an upper frame which suports said cutting blade means and a set of spaced ground engaging wheels depending from said upper frame;

each of said mowing units having rotatably mounted upon its upper frame, a power shaft section;

said power shaft sections each being formed as an elongated rod extending laterally across its associated unit, having one of its ends splined and having its opposite end formed into a universal joint from which a sleeve extends;

said mowing units being arranged in such a manner that the splined end on one power shaft section fits within a sleeve on the next adjacent power shaft section;

said manner of arrangement of said mowing units being such that the cutting blade means on said units are alternately disposed in stepped and partially overlapped arrangement on opposite sides of the axis extending through the power shaft when said sections are interfitted with one another to form a continuous colinear articulated power shaft;

adjustment means for varying the height of said wheels to thus vary the position of said cutting blade means relative to said terrain;

swivel coupling means interconnecting each of said mowing units with its next adjacent mowing units;

a pull frame adapted to be attached to an operating vehicle for moving said gang mower across the terrain;

said pull frame including an elongated draw bar extending generally parallel to the axis of said power shaft;

tow rod assemblies connecting each of said mowing units to said draw bar;

each of said tow rod assemblies being swivelly connected to its associated mowing unit and pivotally attached to said pull bar to allow free relative movement between said mowing units and said pull frame as said mower is moved across the terrain;

drive means operative to rotate said power shaft; and power transfer means for converting the rotary motion of said power shaft into corresponding rotary motion of all of said cutting blade means for thus mowing the grass on said terrain.

9. A gang mower as defined in claim 8 wherein said swivel coupling means includes a ball member projecting from one side of one mowing unit and a socket member projecting from the opposite side of the next adjacent mowing unit whereby said ball and socket members can be mated when said units are properly positioned and arranged.

10. A gang mower as defined in claim 8 wherein said drive means includes a drive shaft mounted by a spaced pair of universal joints and connected between said power shaft and an operating motor on said operating vehicle whereby operation of said motor transmits power through said drive shaft to said power shaft.

11. A gang mower as defined in claim 8 wherein said power transfer means includes:

a first driving pulley affixed to each of said power shaft sections at some point between its ends;

a second driving pulley affixed to a portion of each of said rotatable cutting blade means;

intermediate pulley means disposed between said first and second pulleys; and belt drive means properly trained within all of said pulleys whereby rotation of said power shaft and hence said first pulleys will be transmitted through said belt drive means and intermediate pulley means to said second pulleys which in turn cause rotation and operation of said cutting blade means.

12. A gang mower as defined in claim 8 wherein said cutting blade means is a reel type cutter having a central shaft extending generally parallel to the axis of said power shaft means.

References Cited by the Examiner
UNITED STATES PATENTS

| 1,917,649 | 7/1933 | Kinkead | 56—7 |
| 2,153,876 | 4/1939 | Roseman | 56—7 |
| 2,753,674 | 7/1956 | Cunningham et al. | 56—6 |
| 3,068,630 | 12/1962 | Caldwell | 56—6 |
| 3,070,938 | 1/1963 | Winget | 56—6 |
| 3,115,738 | 12/1963 | Engler | 56—6 |

ABRAHAM G. STONE, *Primary Examiner.*

RUSSELL R. KINSEY, *Examiner.*